US011080163B2

(12) United States Patent
Marum et al.

(10) Patent No.: US 11,080,163 B2
(45) Date of Patent: *Aug. 3, 2021

(54) ADAPTIVE CONTENT BALANCING IN A WEB APPLICATION ENVIRONMENT

(71) Applicant: SugarCRM Inc., Cupertino, CA (US)

(72) Inventors: Matt Marum, Raleigh, NC (US); Henry Rogers, Raleigh, NC (US)

(73) Assignee: SugarCRM Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,398

(22) Filed: Jun. 26, 2018

(65) Prior Publication Data

US 2018/0307581 A1    Oct. 25, 2018

Related U.S. Application Data

(63) Continuation of application No. 15/010,716, filed on Jan. 29, 2016, now Pat. No. 10,007,591.

(51) Int. Cl.
    *G06F 15/173*  (2006.01)
    *G06F 11/34*   (2006.01)
    *H04L 29/08*   (2006.01)

(52) U.S. Cl.
    CPC ...... *G06F 11/3495* (2013.01); *G06F 11/3409* (2013.01); *H04L 67/1012* (2013.01); *G06F 2201/875* (2013.01)

(58) Field of Classification Search
    None
    See application file for complete search history.

(56) References Cited

U.S. PATENT DOCUMENTS

| 8,381,037 B2 * | 2/2013 | DeWitt, Jr. | G06F 11/3409 |
| | | | 711/165 |
| 2013/0103787 A1 * | 4/2013 | Glover | H04L 67/1002 |
| | | | 709/217 |
| 2013/0275561 A1 * | 10/2013 | Phillips | H04L 65/60 |
| | | | 709/219 |
| 2015/0106502 A1 * | 4/2015 | Shakhmetov | H04L 47/76 |
| | | | 709/224 |
| 2015/0304196 A1 * | 10/2015 | Sun | H04L 43/0876 |
| | | | 709/219 |

(Continued)

*Primary Examiner* — Phuoc H Nguyen
(74) *Attorney, Agent, or Firm* — Steven M. Greenberg, Esq.; Shutts & Bowen LLP

(57) ABSTRACT

A method for adaptive content balancing for Web clients includes monitoring content processing performance in different client computing devices communicatively coupled over a network to a content server, measuring the content processing performance for each of the different devices and storing the measured performance for each of the different devices in connection with different resource groupings of the requested content type. Thereafter, a request for content is received in the content server from one of the devices, and the stored performance is retrieved. As such, the retrieved metrics of the computing device are matched to the retrieved metrics of one of a multiplicity of groupings of one or more different resources associated with the requested content and the resources of the one of the multiplicity of the groupings is included in the requested content. Finally, the requested content is transmitted to the one of the client computing devices.

9 Claims, 2 Drawing Sheets

(56) References Cited

U.S. PATENT DOCUMENTS

2016/0134673 A1* 5/2016 MacInnis ................ H04L 65/60
709/231
2016/0192029 A1* 6/2016 Bergstrom .......... H04L 43/0882
725/109

* cited by examiner

ADAPTIVE CONTENT BALANCING IN A WEB APPLICATION ENVIRONMENT

BACKGROUND OF THE INVENTION

Field of the Invention

The present invention relates to content delivery and construction and more particularly to selective delivery and construction of content based upon host device and server connectivity characteristics.

Description of the Related Art

The advent of the Internet and the World Wide Web (the "Web") has created a massive new transport mechanism over which vast volumes of content can be delivered from a content provider to a content consumer. Initially limited to simplistic, static textual documents, the Web now transports terabytes of complex, dynamic multimedia including audio, video and imagery over incredible distances for the selective consumption of requesting end users. Indeed, complex content may be consumed today not only within the context of a conventional Web browser executing in a traditional personal computer, but also within the mobile context of smart phones, tablet computers, wearable computers, and even vehicle consoles including automobiles and airplanes. Content is also no longer just static but rather content often is assembled "on-the-fly" by content servers that generate dynamic data driven views along with content aggregated from distributed computing resources in response to user query parameters and their profile preferences. This complexity has only increased over time as users have come to expect more personalized information, which has resulted in overloaded content servers, network transport infrastructure and host devices.

Of note, part of the end user experience in consuming content depends upon the way in which the content is rendered for viewing by the host device of the end user. In a world of only Web browsers executing in personal computers, all content can be delivered in the same way in order to assure a similar if not identical viewing experience for all end users irrespective of the type of Web browser or type of personal computer. However, in a world of mobile computing, content is rendered differently depending upon the physical display characteristics of each host device in which the same content is rendered. As such, modern content servers identify the nature of the device from which a content request is received and selectively returns content visually tailored specifically to the identified device type. For example, robust content intended for display in a Web browser of a personal computer will render poorly in the limited display of a mobile device. Thus, upon detecting a mobile device in connection with a request for content, limited content formatted consistently with the display capabilities of a mobile device is provided to the requesting mobile device in lieu of the content intended for display in a personal computer.

Largely, the quality and subsequent value the end user experiences while consuming content depends not only upon the nature of the content and the way in which the content is displayed consistent with the characteristics of the host device, but also the speed in which the content is rendered in the host device for presentation to the end user. But, the speed by which content is rendered for presentation to the end user depends upon many unknown factors dependent on the utilization of underlying computing resources of the host device and the network throughput between the host device and content source. Of course, the utilization of fixed computing resources of the host device can vary, for example multitasking impinging CPU and memory allocation, thus varying the speed in which content is rendered in the host device. Additionally, the network transport infrastructure connecting the host to the client is by its nature variable and unreliable especially in a mobile context as the host device moves from local area networks to wireless LANs to cellular data networks. And finally, the execution capacity of the content server can vary content delivery speed due to utilization demand, scaling capability and distributed computing resource availability.

Thus, knowing a priori the speed at which content will ultimately be rendered when delivered to a host device is difficult. Statically choosing to deliver simplistic content based on host device physical characteristics in order to accommodate slower rendering speeds is a solution only to the extent that the host device consistently suffers from poor performance. But in the event that the host device is able to perform adequately, delivering simplistic content is wasteful and prejudices the content experience of the end user. It follows then that knowing a priori whether or not the experience of the end user consuming content will be adequate also is difficult and at best results in the prejudicing of the end user in consuming content from a host device occasionally associated with sub-standard performance. Conversely, statically choosing to always deliver complex content to highly capable host devices can result in a poor user experience if the network does not provide sufficient throughput. Always generating the most complex content for these highly capable hosts can lead to content server sluggishness or expensive virtual computing environment scaling even as the user does not consume much of this rich content.

BRIEF SUMMARY OF THE INVENTION

Embodiments of the present invention address deficiencies of the art in respect to the variable content delivery of Web consumable content and provide a novel and non-obvious method, system and computer program product for adaptive content balancing for Web clients. In an embodiment of the invention, a method for adaptive content balancing for Web clients is provided. The method includes first monitoring the content processing performance for a particular content request type by one or more different client computing devices communicatively coupled over a computer communications network to a content server executing in memory of a host computing system. The method also includes measuring the monitored content processing performance for each of the different client computing devices and then storing the measured content processing performance in connection with each of the different client computing devices.

Thereafter, when a request for content is received by the content server from one of the client computing devices from over the computer communications network, the content processing performance that was stored in connection with the one of the client computing devices is retrieved for the current content request type. In response, the retrieved content processing performance is matched to one of a multiplicity of groupings of one or more different resources associated with the requested content type. Consequently, the resources of the one of the multiplicity of the groupings are included in the requested content. Finally, the requested content with the resources of the one of the multiplicity of groupings is transmitted to the requesting client computing device.

In one aspect of the embodiment, the content processing performance is a time taken to compile code disposed in content received for rendering in a content browser. In another aspect of the embodiment, the content processing performance is a time taken to render content received for rendering in a content browser. In yet another aspect of the embodiment, the content processing performance is a duration of time in which content is displayed in a content browser before new content is requested for display in the content browser. In yet another aspect of the embodiment, the content processing performance is whether the content is displayed in the content browser viewport. In even yet another aspect of the embodiment, the matching includes determining a current content processing performance for the one of the client computing devices and submitting to a rule the current content processing performance along with the retrieved content processing performance in order to produce the one of a multiplicity of groupings of the one or more different resources associated with the requested content. Finally, in another aspect of the embodiment, the multiplicity of groupings of the one or more different resources include at least one grouping of only text and another grouping of the text along with graphical elements.

In another embodiment of the invention, a content delivery data processing system is configured for adaptive content balancing for Web clients. The system includes a host computing system that includes one or more computers, each with memory and at least one processor. The system also includes a content server executing in the memory of the host computing system. The system also includes monitoring, measuring and storing the content generation performance by the content server in connection with each of the content request types as an aggregate. Finally, the system includes a content balancing module coupled to the content server. The module includes program code enabled upon execution in the host computing system to monitor content processing performance in a multiplicity of different client computing devices communicatively coupled over a computer communications network to the content server, and to measure the content processing performance for each of the different client computing devices. As well, the program code of the module is enabled to store the measured content processing performance connection with each of the different client computing devices.

Of note, the program code is enabled thereafter to receive from one of the client computing devices from over the computer communications network, a request for content in the content server, and to respond to the request by retrieving from the content server, the content processing performance stored in connection with the one of the client computing devices providing the request for content. Thereafter, the retrieved content processing performance is matched by the program code to one of a multiplicity of groupings of one or more different resources associated with the requested content. Once matched, the resources of the one of the multiplicity of the groupings are included in the requested content, and the program code directs the content server to transmit the requested content with the resources of the one of the multiplicity of groupings to the client computing device providing the content request.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for adaptive content balancing for Web clients. In accordance with an embodiment of the invention, different resources in content are grouped together in different groupings of varying visual complexity (or optionally audible complexity). The different groupings for the same content are then associated with different performance profiles indicating an ability of an end user device to rapidly present content to an end user for consumption in a Web browser. In this regard, the performance profiles may be based upon previously measured times within a target computing device to compile content, previously measured times within a target computing device to render content, or the duration of time in which content is displayed in a browser before new content is requested. Thereafter, in response to the receipt of a request for content from a particular end user computing device, a performance profile is determined for the particular end user computing device and matched to an associated one of the resource groupings. Finally, the content is arranged to include only those resources of the matched one of the resource groupings and then the content is delivered to the particular end user computing device. In this way, the nature of the content delivered to the particular end user computing device is balanced to accommodate the known ability of the particular end user computing device to present the content in an acceptable way to provide an optimal end user experience.

Figure 1:
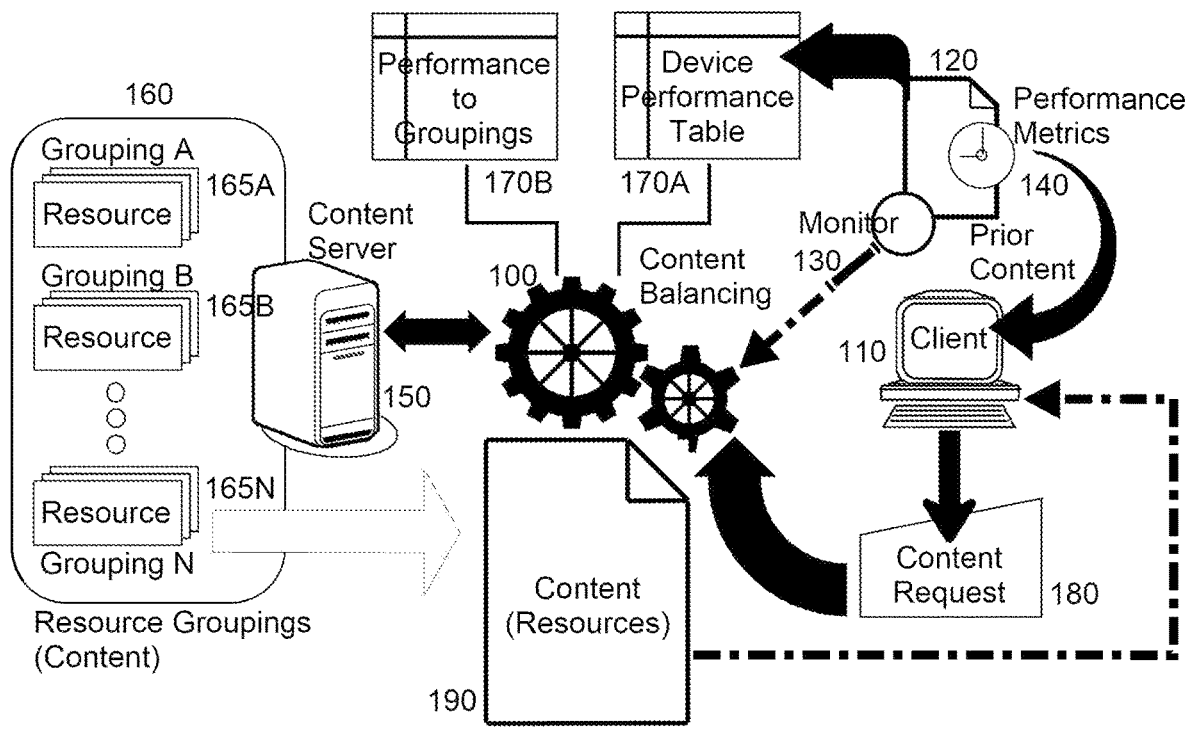
FIG. 1 is a pictorial illustration of a process for adaptive content balancing for Web clients.

In further illustration, FIG. 1 is a pictorial illustration of a process for adaptive content balancing for Web clients. As shown in FIG. 1, content balancing logic 100 employs a monitor 130 to monitor the content processing performance 140 of a computing client 110 when processing content 120 in a Web browser of the computing client 110. In this regard, the monitor 130 may monitor and measure the time taken to compile code for the content 120 so that the content 120 may be rendered in the Web browser of the computing client 110, the monitor 130 may monitor and measure the time taken to render the content 120 in the Web browser of the computing client 110, or both. Thereafter, the measured content processing performance 140 may be stored in a device performance table 170 in connection with the computing client 110 as a performance profile corresponding to a computed ability of the computing client 110 to rapidly compile and render content.

Subsequently, in response to receiving from the computing client 110 a content request 180 for content 190, the content balancing logic 100 either receives directly from the computing client 110 a performance profile, or to the extent that the performance profile is stored in the content server 150, identifies a performance profile for the computing client 110 in the device performance table 170A. In either circumstance, the performance profile is matched in a performance to groupings table 170B to one grouping of resources 165A, 165B, 165N within a set 160 of the groupings 165A, 165B, 165N. More particularly, each of the groupings 165A, 165B, 165N includes a differing arrangement of resources for inclusion in the requested content 190, ranging from a simplistic arrangement of mere text, to a complex arrangement of text, imagery and multimedia.

As it will be understood, the greater the complexity of an arrangement of resources in a particular one of the groupings 165A, 165B, 165N included in the requested content 190, the greater the device performance will be required to adequately compile and render the requested content 190. As such, once the performance profile has been matched to one of the groupings 165A, 165B, 165N in the set 160, the resources of the matched one of the groupings 165A, 165B, 165N are incorporated into the requested content 190 and the content balancing logic 100 directs the content server 150 to return the requested content 190 to the computing client 110 for rendering therein.

Figure 2:
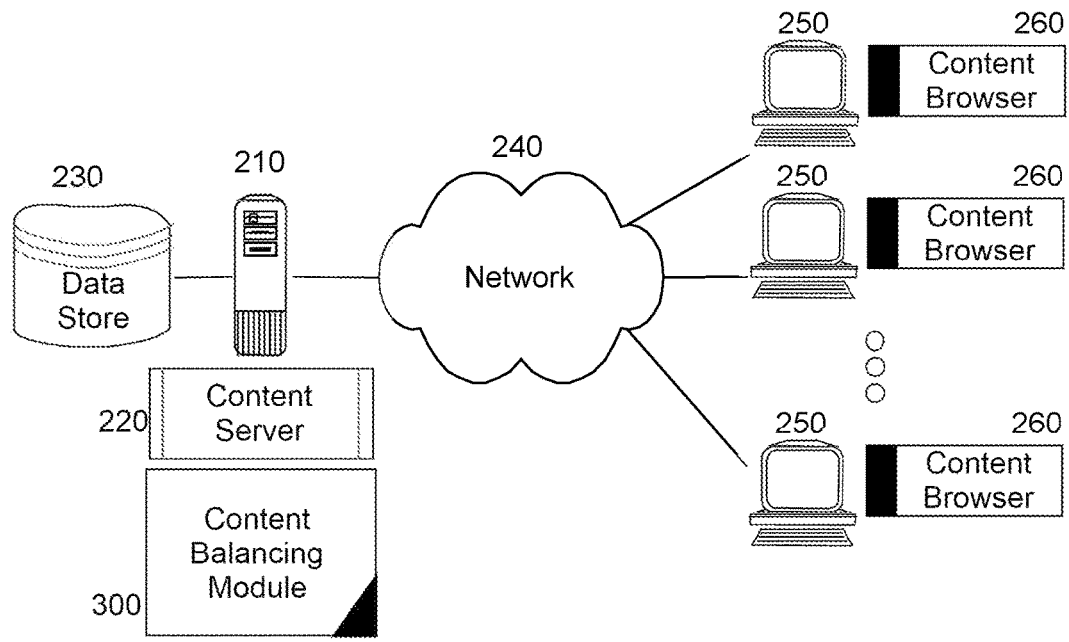
FIG. 2 is a schematic illustration of a content delivery data processing system configured for adaptive content balancing for Web clients; and, FIG. 3 is a flow chart illustrating a process for adaptive content balancing for Web clients.

The process described in connection with FIG. 1 is implemented in a content delivery data processing system. In yet further illustration, FIG. 2 schematically shows a content delivery data processing system configured for adaptive content balancing for Web clients. The system includes a host computing system 210 that includes one or more computers, each with memory and at least one processor (only a single computer shown for ease of illustration). The host computing system 210 supports the operation of a content server 220 such as a Web server that serves content disposed in a data store 230 over computer communications network 240 to requesting end users through corresponding content browsers 260 operating respectively within different computing clients 250. In this regard, the content includes different resources such as text, imagery and audiovisual elements and may be statically defined, or dynamically assembled in response to the receipt of a content request for the content.

Of note, a content balancing module 300 is coupled to the content server 220. The content balancing module 300 includes program code that when executed in the host computing system 210 in connection with the operation of the content server 220, is enabled to monitor and measure content processing performance of the different computing clients 250 when processing content in respective content browsers 260. For instance, a time taken to compile script or code in content to be rendered may be measured, or a time taken to render the content may be measured. In either circumstance, the program code of the module 300 is enabled to characterize and store in the data store 230 the monitored and measured content processing performance in accordance with a performance profile, such as "slow", "medium", "fast"; or "1", "2", "3", or any other range of measurements.

The program code of the module 300 yet further is enabled upon execution in the host computing system 210 to respond to a content request for particular content by one of the computing clients 250 by determining a performance profile for the requesting one of the computing clients 250 and by matching the determined performance profile to a specific grouping of resources most appropriate for the determined performance profile. Consequently, the program code of the module 300 then includes the resources of the matched specific grouping into the requested content in lieu of other resources of other groupings more appropriate for different performance profiles. Finally, the program code of the module 300 directs the content server 220 to transmit the requested content to the requesting one of the computing clients 250.

Figure 3:
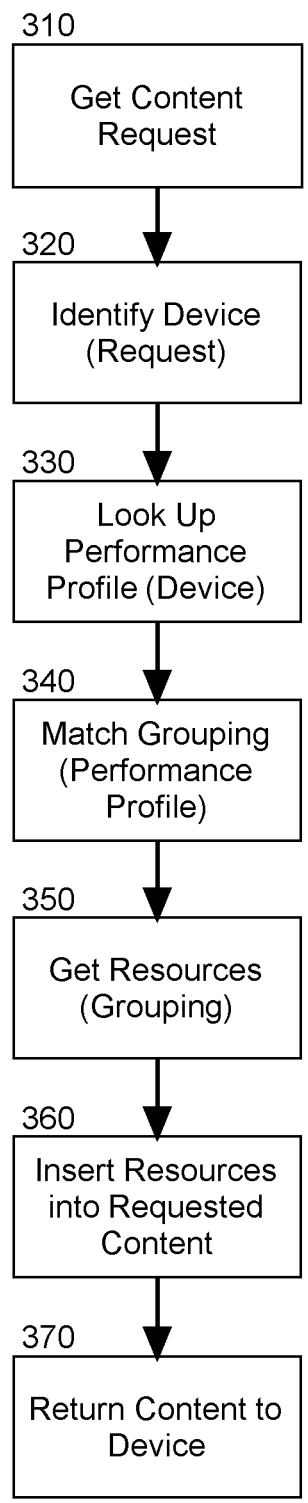

In even yet further illustration of the operation of the content balancing module 300, FIG. 3 is a flow chart illustrating a process for adaptive content balancing for Web clients. Beginning in block 310, a content request is received from a requesting computing client. In block 320, the requesting computing client is identified and in block 330, a performance profile is determined for the identified computing client, either by dynamically receiving an indication of the performance profile from the identified computing client, or by retrieving a previously stored performance profile of the computing client. In block 340, then, the performance profile is matched to a particular grouping of resources to be included in the requested content. In block 350, resources of the matched grouping are retrieved and included in the requested content in block 360. Finally, in block 370 the requested content is returned to the requesting computing client.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for adaptive content balancing for Web clients, the method comprising:

monitoring content processing performance in each different one of a multiplicity of different client computing devices communicatively coupled over a computer communications network to a content server executing in memory of a host computing system, the performance comprising both a time taken to render content received from the content server within a content browser for each respective one of the devices and also a time taken to compile computer program code within the received content in the content browser, measuring the content processing performance for each of the different client computing devices based upon the time taken for both rendering and compilation, and storing the measured content processing performance in the content server for each of the different client computing devices;

receiving from one of the client computing devices from over the computer communications network, a request for content in the content server;

retrieving from the content server performance metrics stored in connection with the one of the client computing devices;

matching the retrieved performance metrics to one of a multiplicity of groupings of one or more different resources associated with the requested content;

including the resources of the one of the multiplicity of the groupings in the requested content; and, transmitting the requested content to the one of the client computing devices.

2. The method of claim 1, wherein the matching includes determining a current content processing performance for the client computing device and submitting to a rule the current content processing performance in order to produce the one of a multiplicity of groupings of the one or more different resources associated with the requested content.

3. The method of claim 1, wherein the multiplicity of groupings of the one or more different resources include at least one grouping of only text and another grouping of the text along with graphical elements.

4. A content delivery data processing system configured for adaptive content balancing for Web clients, the system comprising:

a host computing system comprising one or more computers, each with memory and at least one processor;

a content server executing in the memory of the host computing system; and, a content balancing module coupled to the content server, the module comprising program code enabled upon execution in the host computing system to monitor content processing performance in each different one of a multiplicity of different client computing devices communicatively coupled over a computer communications network to a content server executing in memory of a host computing system, the performance comprising both a time taken to render content received from the content server within a content browser for each respective one of the devices and also a time taken to compile computer program code within the received content in the content browser, to measure the content processing performance for each of the different client computing devices based upon the time taken for both rendering and compilation, and to store the measured content processing performance in the content server for each of the different client computing devices, to receive from one of the client computing devices from over the computer communications network, a request for content in the content server, and to respond to the request by retrieving from the content server performance metrics stored in connection with the one of the client computing devices, to match the retrieved performance metrics to one of a multiplicity of groupings of one or more different resources associated with the requested content, to include the resources of the one of the multiplicity of the groupings in the requested content, and to direct the content server to transmit the requested content to the one of the client computing devices.

5. The system of claim 4, wherein the matching includes determining a current content processing performance for the client computing device and submitting to a rule the current content processing performance in order to produce the one of a multiplicity of groupings of the one or more different resources associated with the requested content.

6. The system of claim 4, wherein the multiplicity of groupings of the one or more different resources include at least one grouping of only text and another grouping of the text along with graphical elements.

7. A computer program product for adaptive content balancing for Web clients, the computer program product comprising a non-transitory computer readable storage medium having program instructions embodied therewith, the program instructions executable by a device to cause the device to perform a method comprising:

monitoring content processing performance in each different one of a multiplicity of different client computing devices communicatively coupled over a computer communications network to a content server executing in memory of a host computing system, the performance comprising both a time taken to render content received from the content server within a content browser for each respective one of the devices and also a time taken to compile computer program code within the received content in the content browser, measuring the content processing performance for each of the different client computing devices based upon the time taken for both rendering and compilation, and storing the measured content processing performance in the content server for each of the different client computing devices;

receiving from one of the client computing devices from over the computer communications network, a request for content in the content server;

retrieving from the content server performance metrics stored in connection with the one of the client computing devices;

matching the retrieved performance metrics to one of a multiplicity of groupings of one or more different resources associated with the requested content;

including the one or more different resources of the one of the multiplicity of the groupings in the requested content; and, transmitting the requested content to the one of the client computing devices.

8. The computer program product of claim 7, wherein the matching includes determining a current content processing performance for the client computing device and submitting to a rule the current content processing performance in order to produce the one of a multiplicity of groupings of the one or more different resources associated with the requested content.

9. The computer program product of claim 7, wherein the multiplicity of groupings of the one or more different resources include at least one grouping of only text and another grouping of the text along with graphical elements.

* * * * *